United States Patent
Fava

(10) Patent No.: US 8,683,915 B2
(45) Date of Patent: Apr. 1, 2014

(54) MOULDING UNIT FOR FORMING AND COOKING MEAT

(75) Inventor: Antonio Fava, Parma (IT)

(73) Assignee: Fava S.N.C. de Adele Turetta & C., Parma (IT)

(*) Notice: Subject to any disclaimer, the term of this patent is extended or adjusted under 35 U.S.C. 154(b) by 240 days.

(21) Appl. No.: 13/147,182

(22) PCT Filed: Jan. 28, 2010

(86) PCT No.: PCT/EP2010/050973
§ 371 (c)(1),
(2), (4) Date: Oct. 17, 2011

(87) PCT Pub. No.: WO2010/089238
PCT Pub. Date: Aug. 12, 2010

(65) Prior Publication Data
US 2012/0024168 A1    Feb. 2, 2012

(30) Foreign Application Priority Data
Feb. 3, 2009   (IT) ............................... RE2009A0007

(51) Int. Cl.
*A22C 7/00*      (2006.01)
*A21C 3/00*      (2006.01)
*B30B 7/02*      (2006.01)

(52) U.S. Cl.
USPC ............... 99/349; 99/351; 99/353; 99/441; 249/126; 249/159; 249/167

(58) Field of Classification Search
USPC ............ 99/349, 350, 351, 353, 441; 249/82, 249/167, 126, 159; 206/558, 564, 504, 505; 220/23.2, 23.6, 23.4, 23.8
See application file for complete search history.

(56) References Cited

U.S. PATENT DOCUMENTS

| | | | | |
|---|---|---|---|---|
| 2,310,956 A * | 2/1943 | Hoy | ............................... | 99/351 |
| 2,575,294 A * | 11/1951 | Putorak | ....................... | 220/23.4 |
| 3,734,309 A * | 5/1973 | Bateman | ....................... | 206/504 |
| 5,433,314 A * | 7/1995 | Lin | ............................... | 206/5.1 |
| 5,921,171 A | 7/1999 | Dreano | | |
| 5,992,304 A * | 11/1999 | Champalaune et al. | ........ | 99/349 |
| 6,743,008 B2* | 6/2004 | Dreano | ........................ | 425/233 |
| 7,118,368 B2* | 10/2006 | Dreano | ........................ | 425/195 |
| 8,087,527 B2* | 1/2012 | Johnson | ....................... | 220/23.4 |
| 8,381,910 B2* | 2/2013 | Cadoret et al. | ................ | 206/511 |
| 2008/0163761 A1 | 7/2008 | Champalaune et al. | | |

FOREIGN PATENT DOCUMENTS

| | | | |
|---|---|---|---|
| EP | 0722663 A1 | 7/1996 | |
| FR | 2688385 A1 | 9/1993 | |
| FR | 2754677 A1 | 4/1998 | |
| FR | 2882630 A1 | 9/2006 | |

* cited by examiner

*Primary Examiner* — Reginald L Alexander
(74) *Attorney, Agent, or Firm* — Volpe and Koenig, P.C.

(57) ABSTRACT

A molding unit for forming and cooking meat, comprising a single recipient-shaped bottom die a concavity of which faces upwards and is destined to contain meat, and a single cover aligned with a mouth of the concavity of the bottom die, which cover is joined to the bottom die and positioned below the bottom die, such as to be destined to close a further mouth of a further concavity of a bottom die of a molding unit which is identical and positioned below the molding unit.

12 Claims, 15 Drawing Sheets

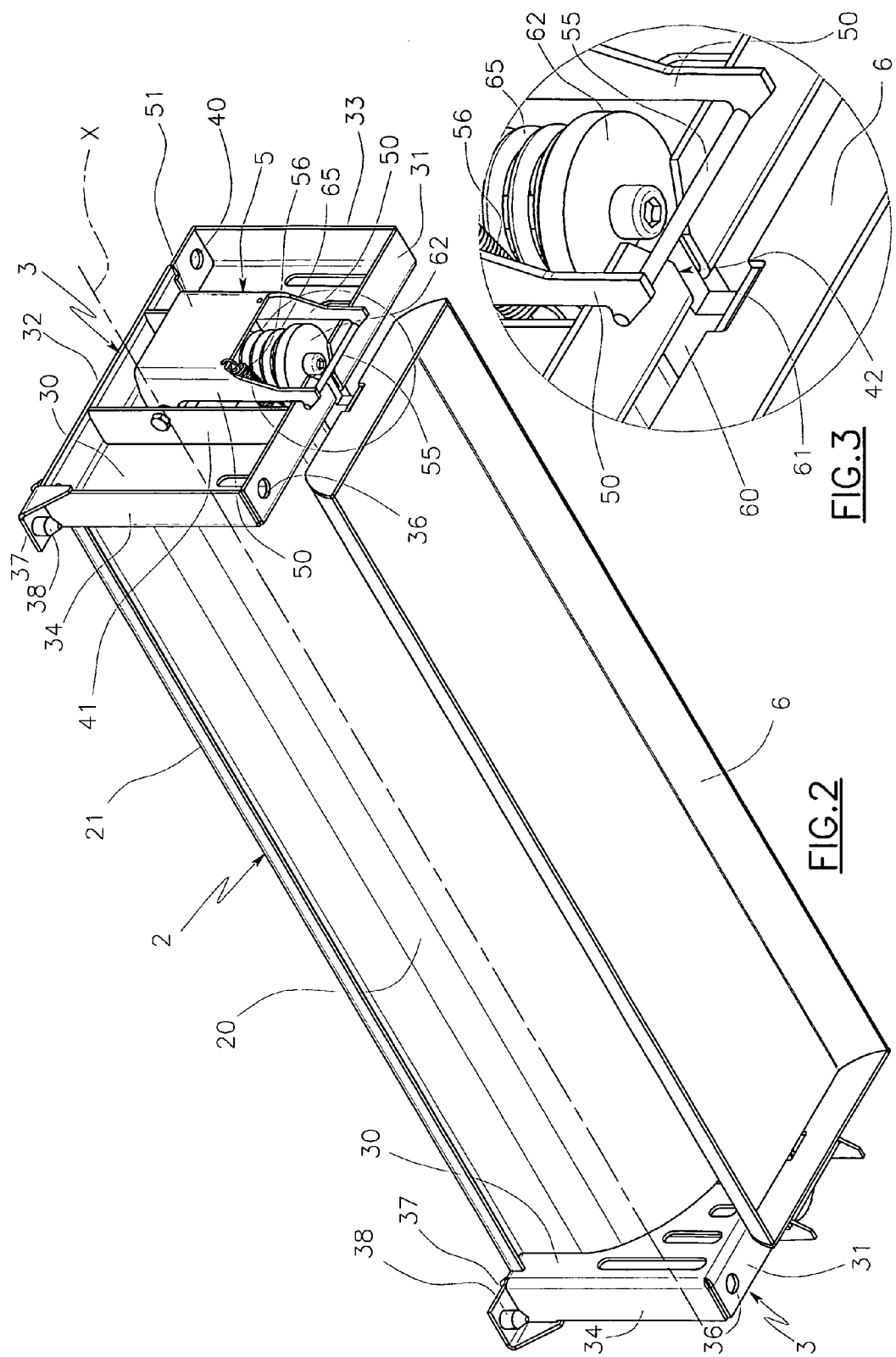

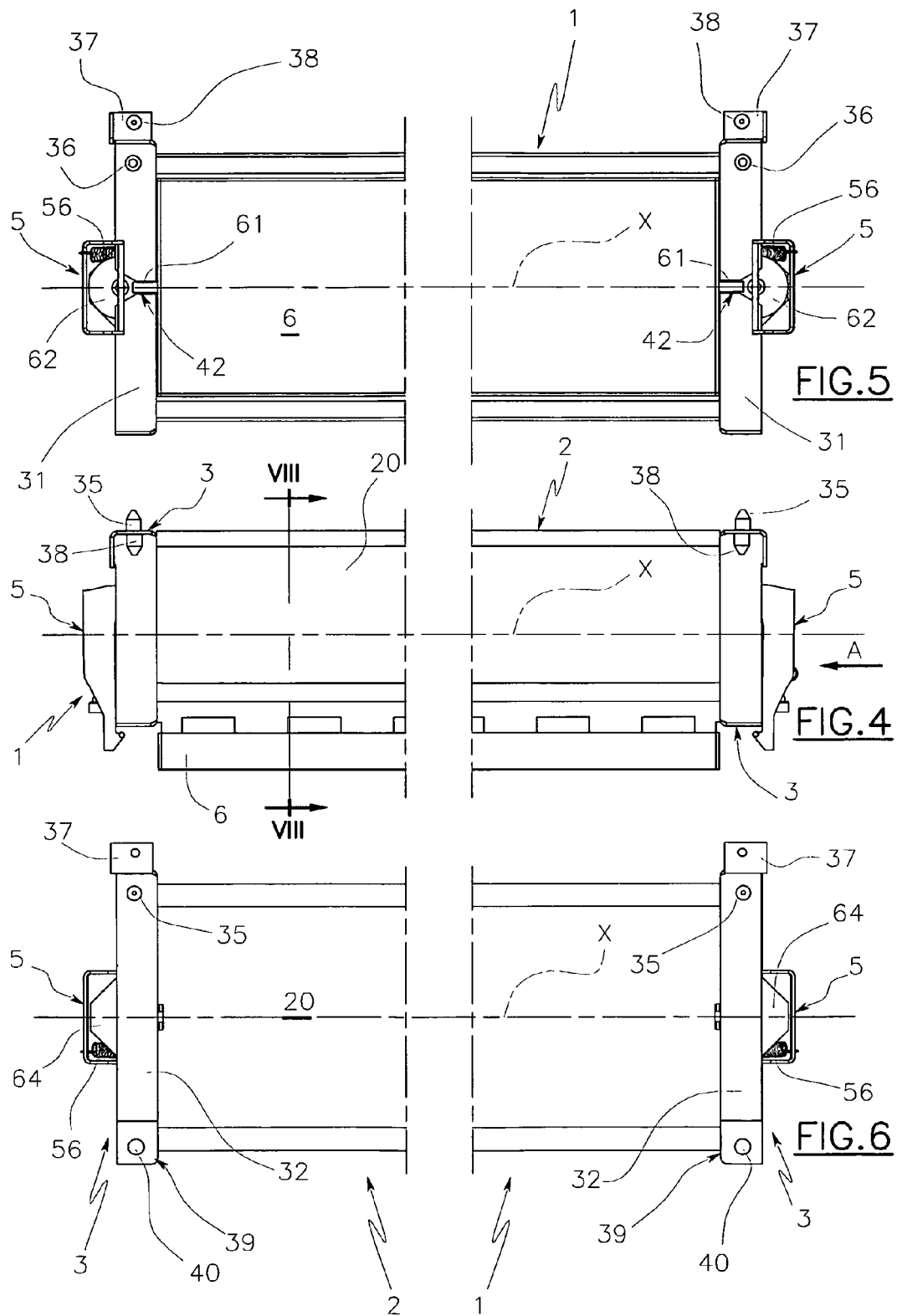

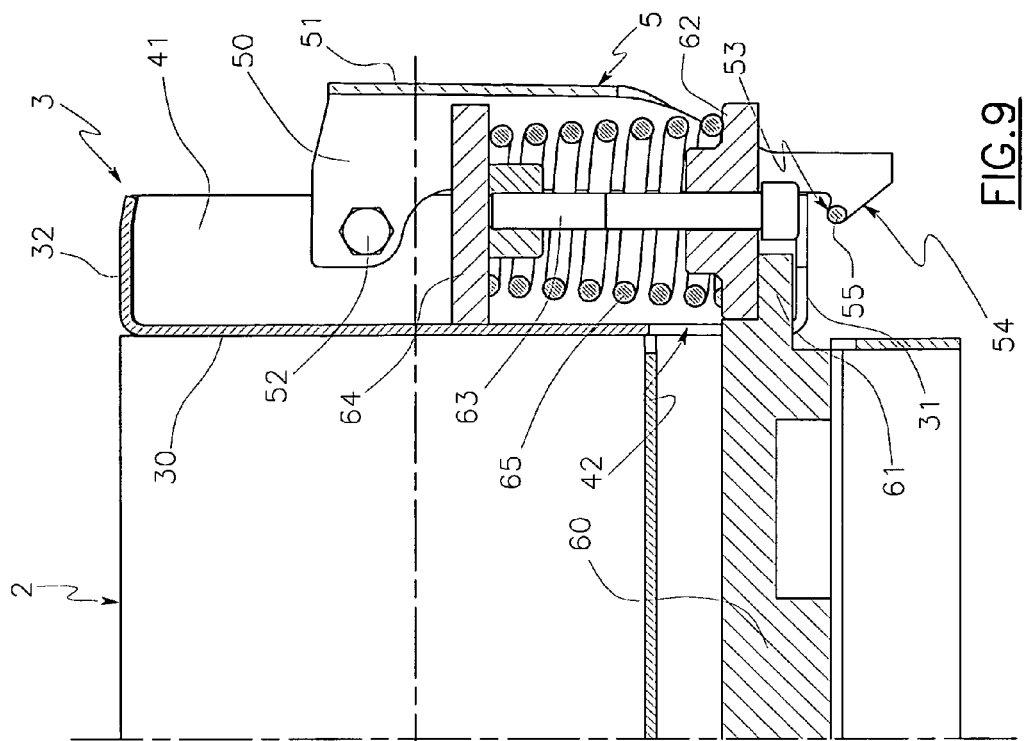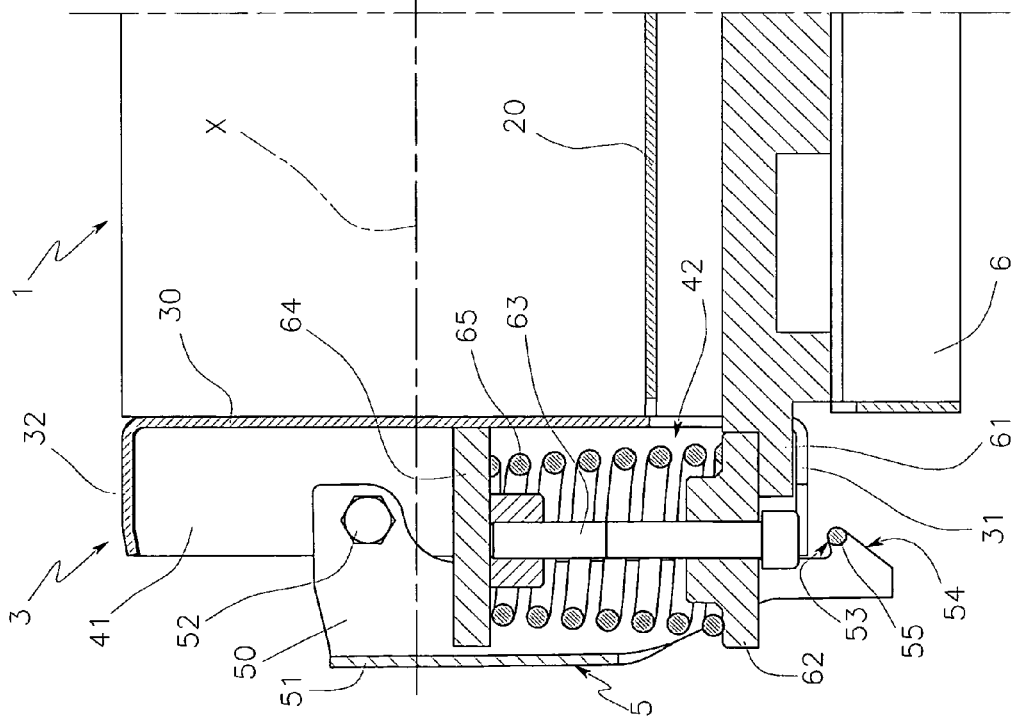
FIG.9

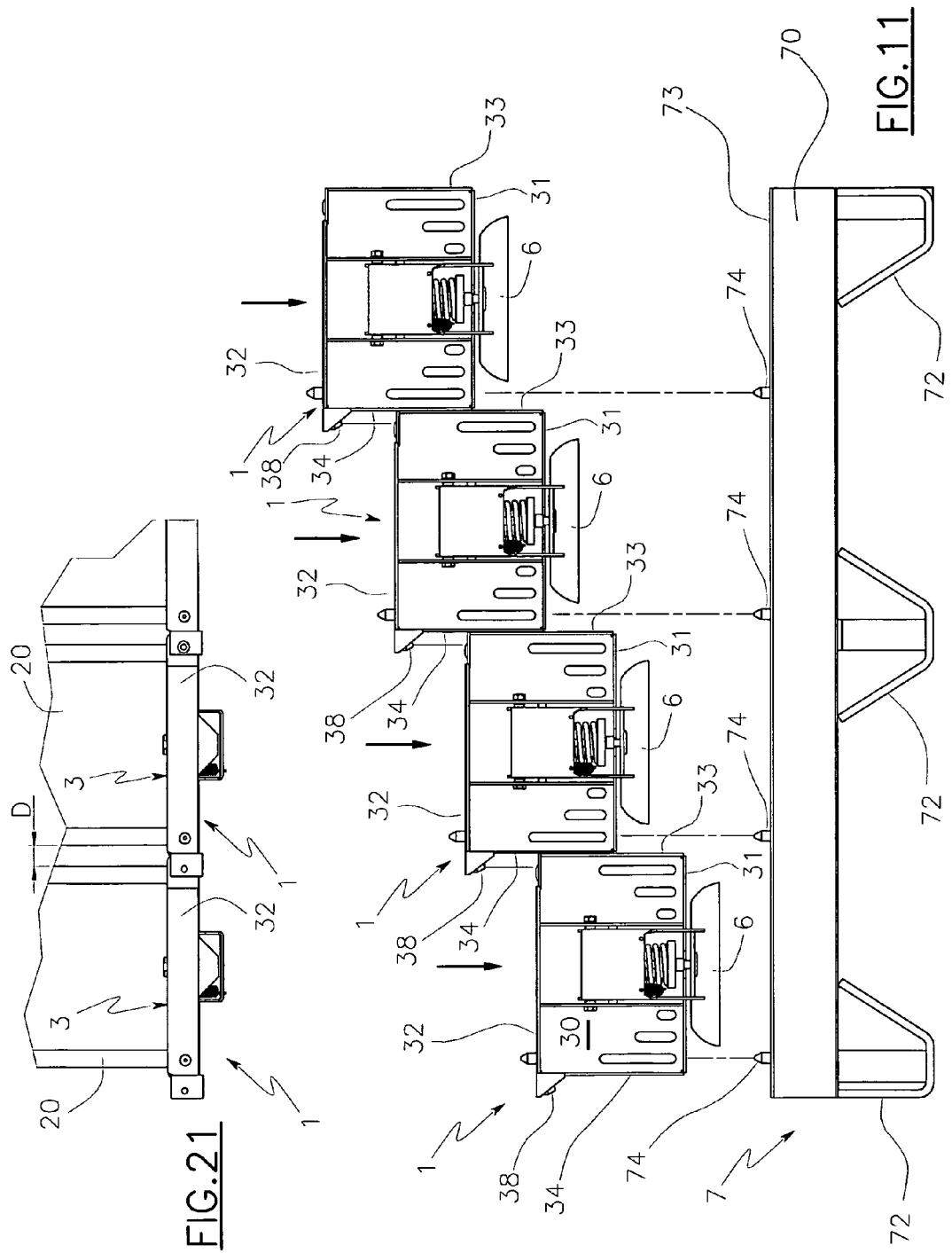

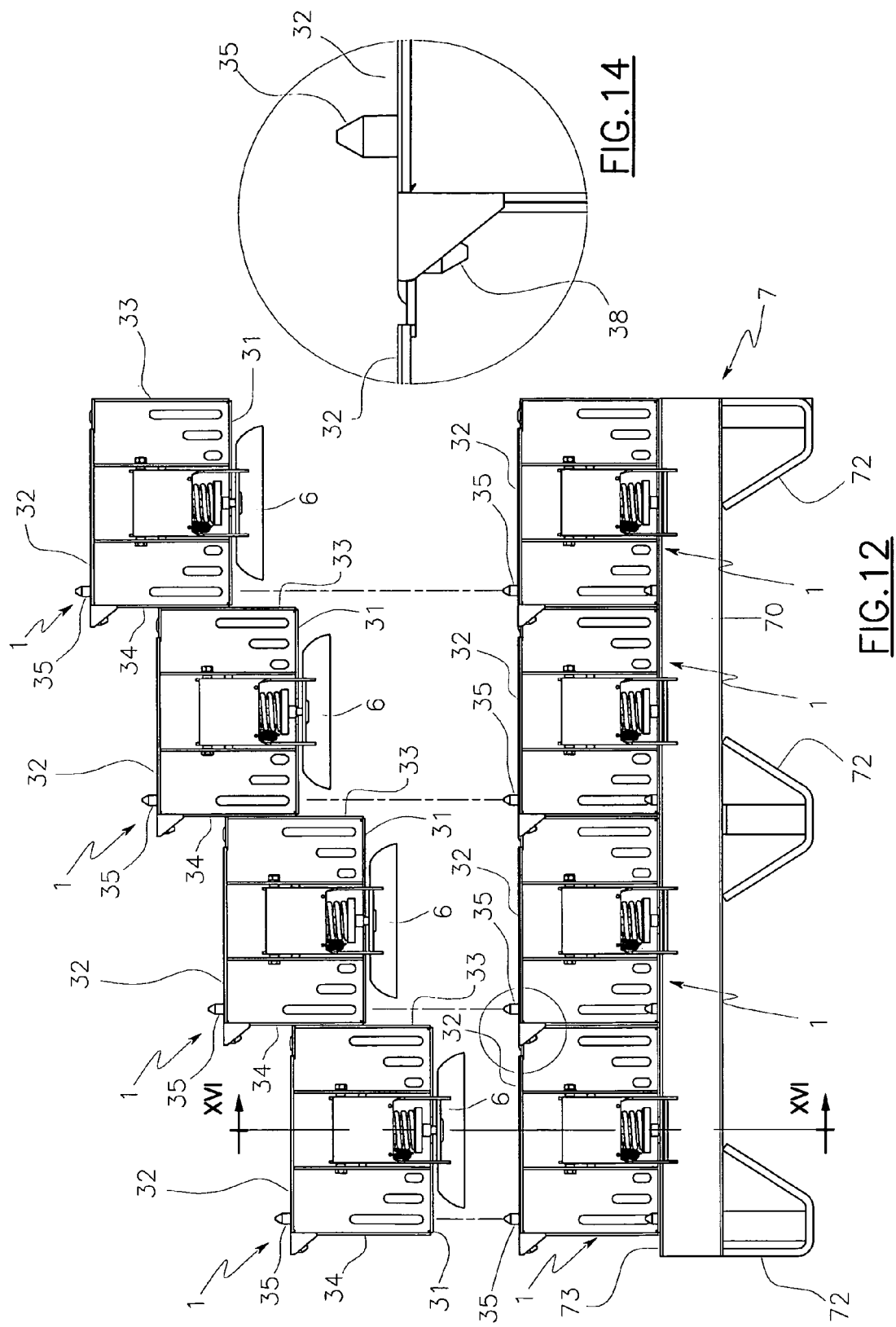

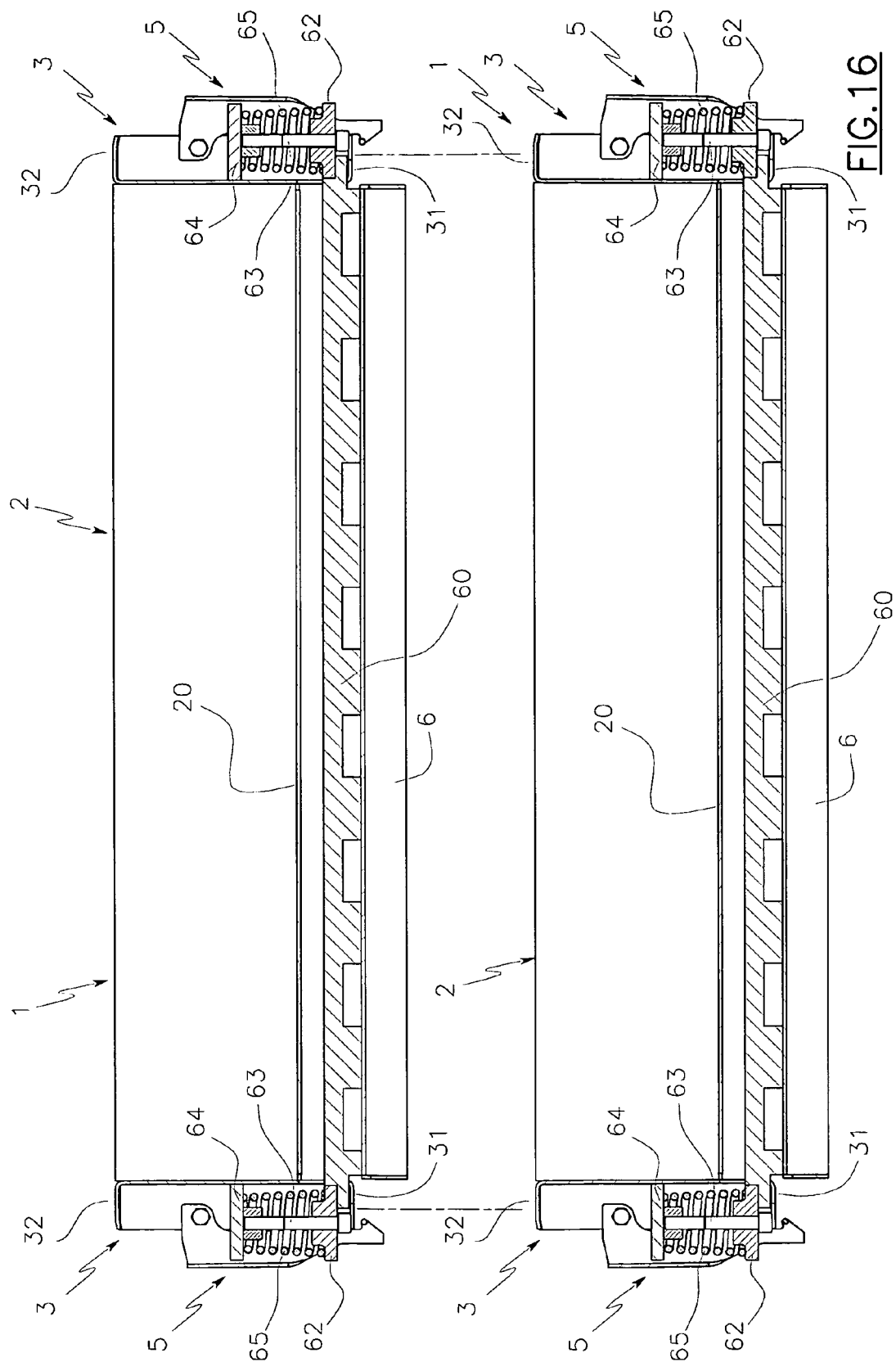

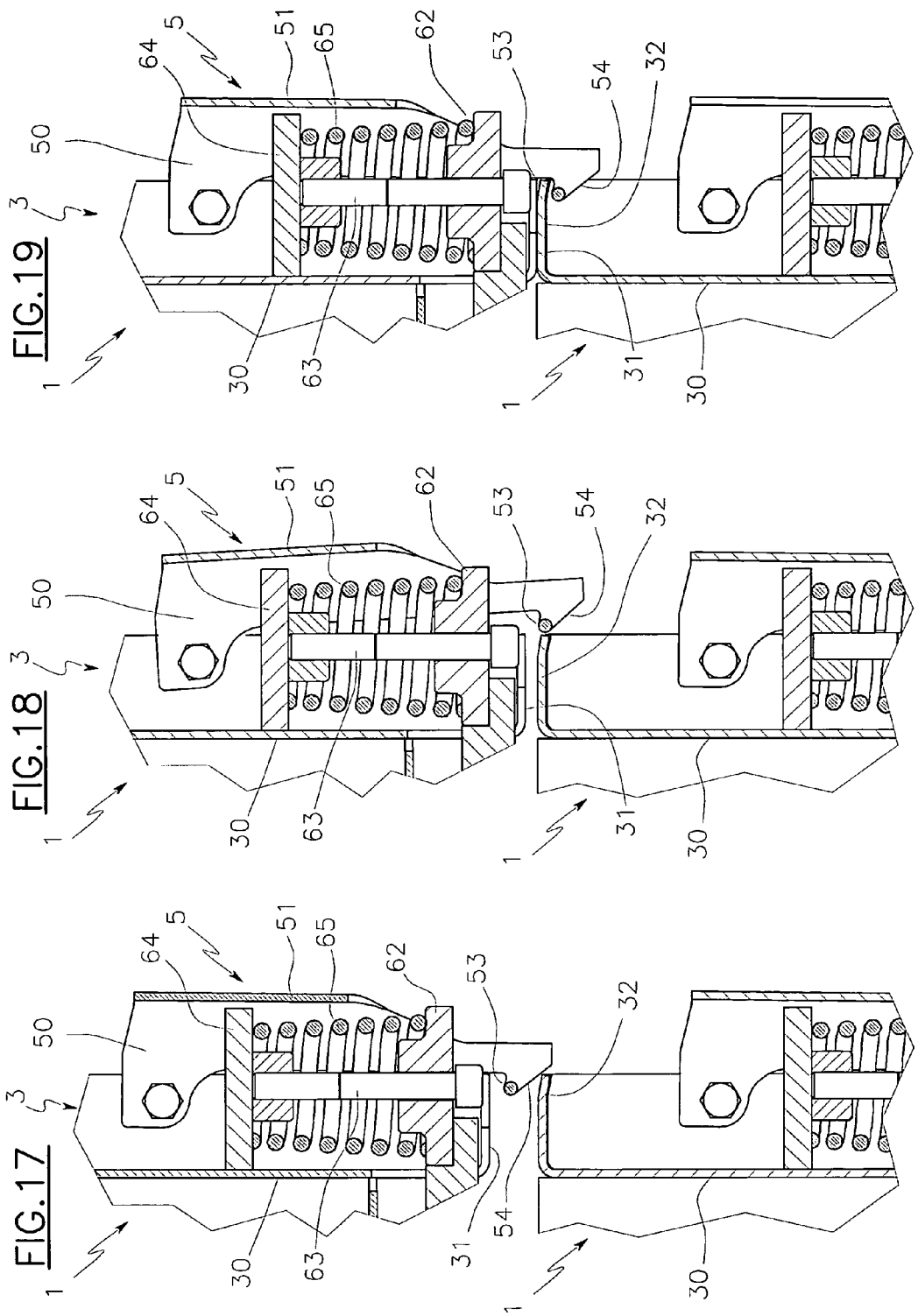

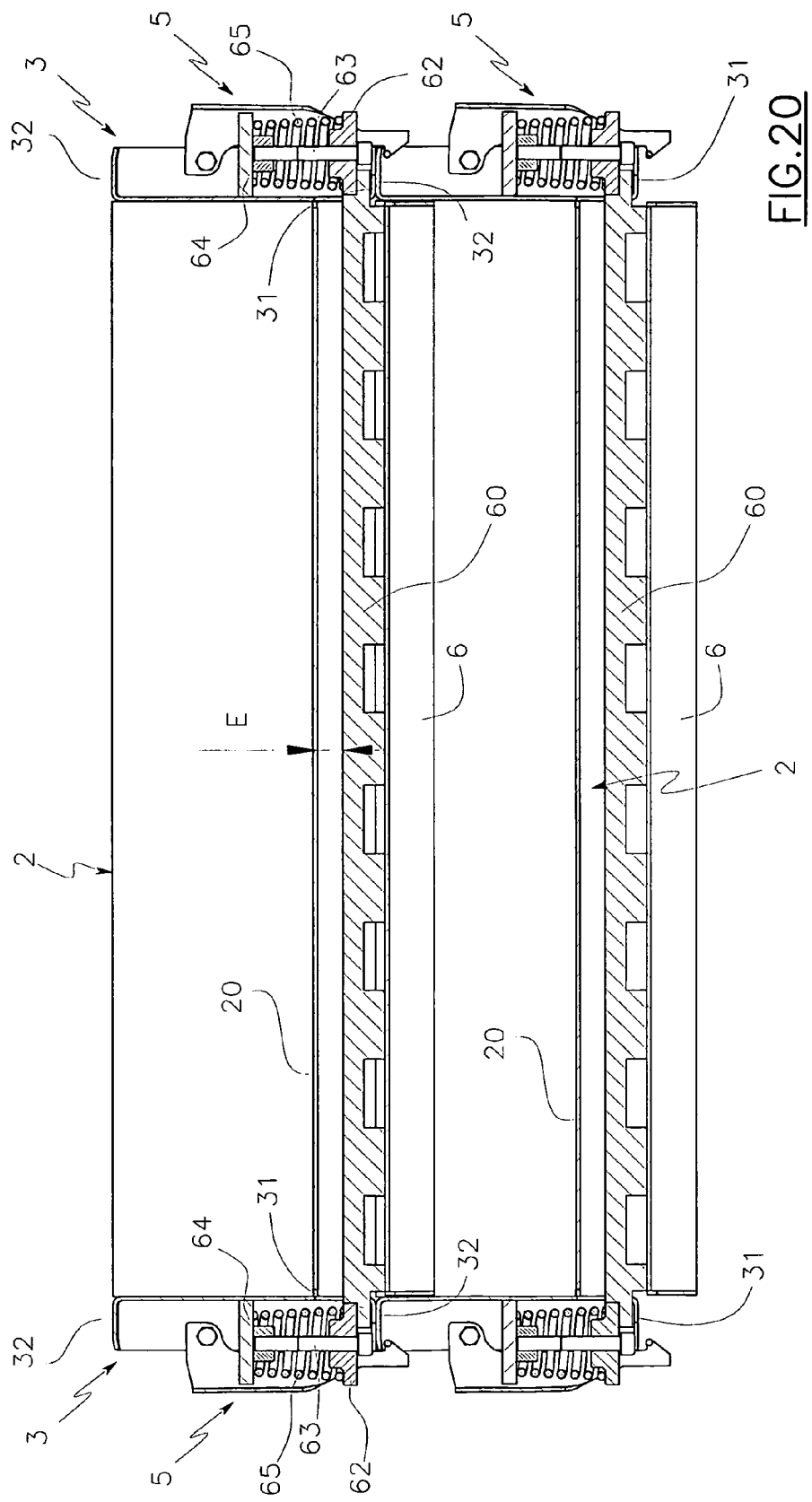

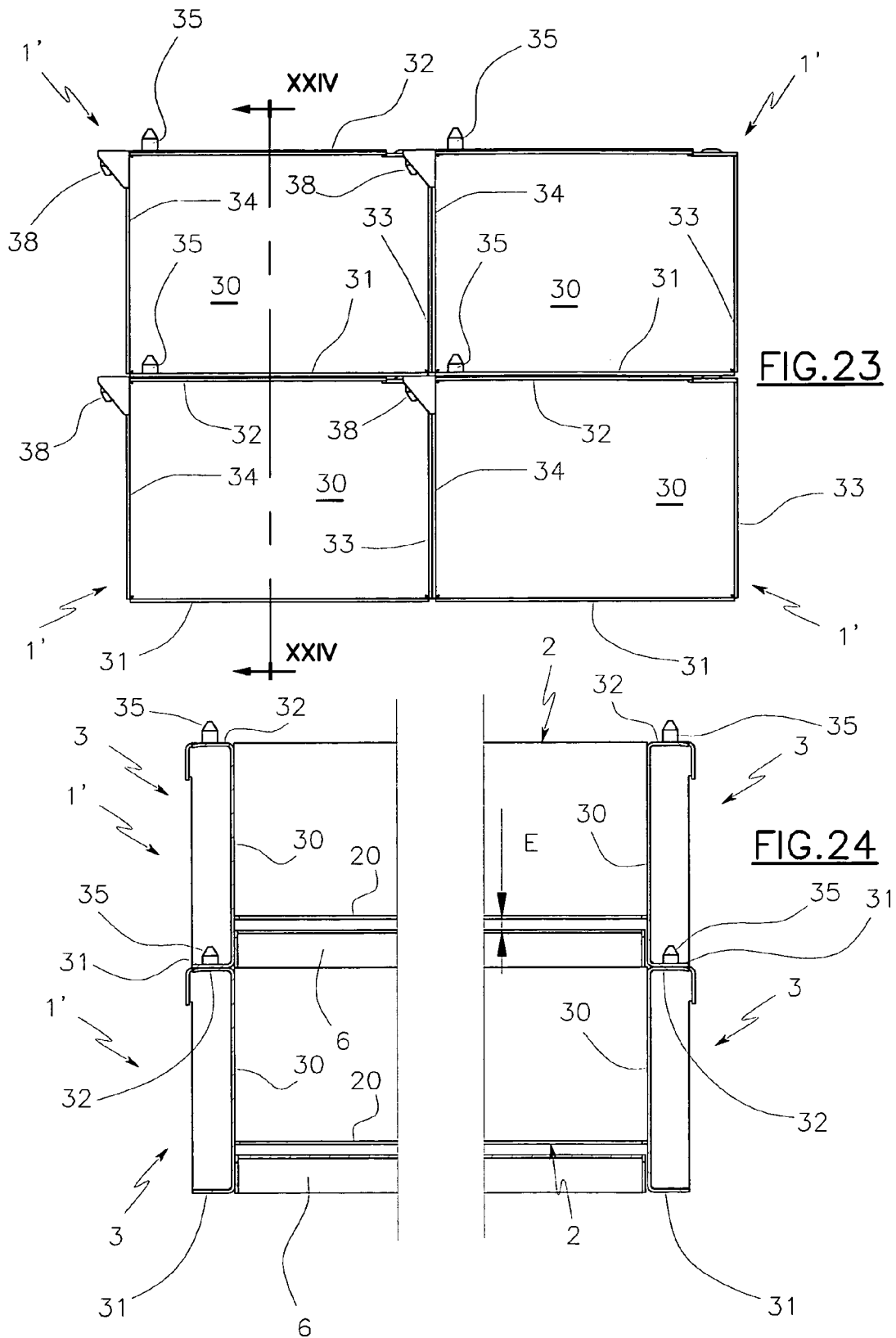

MOULDING UNIT FOR FORMING AND COOKING MEAT

FIELD OF INVENTION

The invention relates to moulding units for forming and cooking meat, in particular pork-meats such as cooked ham and like products.

BACKGROUND

The market offers various systems for producing cooked ham (and like products) and in particular in loaf shapes, whole or transversally fractioned, a production of which provides considerable advantages for the sold and sliced product as it notably increases the performance of the slicing and packing lines, as well as reducing waste at the ends of the loaves.

According to the most tried and tested technology, semi-worked products destined for production of loaves are cooked in waterproof casings where the product is not in contact with the air (termed "vacuum cooking") in order to improve the compactness and single-body-effect of the product.

This technology includes the introduction of ham or shoulder (but can be applied to white meats and in any case for meats in general) in waterproof packs which are housed in moulds which impress on them a particular shape which during cooking thereof will become stable.

The waterproof packs are advantageously, though not exclusively, constituted by bags made of a flexible and heat-weldable plastic material, which are filled with the product (meat, possibly treated by injection of saline solutions and massaged by suitable machines), and are then vacuum-sealed such as to hermetically insulate the meat placed in the bag from the outside environment.

The introduction of the meat into the bags can be done in various ways. A first of these modalities comprises housing the empty bags directly in the moulds, introducing the meat and finally heat-welding the bags under vacuum by special machines (vacuum heat-welders).

A second of the modalities includes housing the empty bags, or pre-formed bags, internally of containers ("false moulds"), introducing the meat, heat-welding the bags (or pre-formed bags) under vacuum using special machines (heat-formers and/or capsule fillers, according to the specific case) and finally transferring the thus-prepared products internally of the moulds.

A third modality involves the use of vacuum-bagging machines for inserting the meat in "tubes" of flexible plastic material, which are then closed at ends thereof by stapling machines, forming closed bags which are then transferred internally of the moulds.

Whatever method chosen for introducing the meat into the bags, the present invention relates to the moulds in which the bags are housed for forming and cooking the meat. In general, the moulds can be made in two ways.

The first of these relates to single moulds comprising:

a bottom die made in the form of a recipient for containing the meat, with a concavity of the recipient facing upwards;

a cover for closing the bottom die and sliding internally of the upper mouth of the concavity;

a contrast element constrained to the bottom die, and elastic pushing means for pushing the cover to compress the meat contained in the bottom die, interposed between the cover and the contrast element (producers of these moulds are: Menozzi, Manzini, Riva and other international producers).

The products are obtained by positioning the bag internally of the bottom die and positioning the product, then closing the bag about the product, possibly by vacuum heat-welding), positioning and pressing the cover, and thus subjecting the product to cooking while contained in the mould.

The muscle bundles resulting from the anatomical sectioning of the animal can be placed in the moulds, which leads to a spatial conditioning of the product in the bottom die, which in this case produces a slice of meat which is similar to a product cooked whole, with better results in terms of performance and firmness of the slice.

The products are differentiated in products either without or with "weight loss", i.e. with a reduction in weight, which occurs because during cooking of the meat a liquid or gelatinous part (the "exudate") separates out, which in the case of vacuum cooking remains inside the cooking bag.

Owing to this phenomenon, an extra part has to be included in the sealed bag, which part is empty at the start and in which the exudate collects during the cooking stage, such that the exudate does not remain internally of the final product.

"Weight loss" relates to products exhibiting, in the cooking bag, a presence of exudate exceeding 3%.

As a general rule, though not to be taken too literally, the greater the weight loss the greater the quality of the final product.

The above-described moulds optimally exploit the weight-loss method and can also accept relatively-high weight loss, as they enable the exceeding part of the bag to be arranged flanked and parallel to the product, outside the mould.

While permitting top-quality production, these moulds do not permit efficient and rational use of traditional ovens, in which it is industrially necessary to insert the product in regular and rational stacks, this being a consequence of the moulds' being shaped such that they are not stackable in a satisfactory way.

It is not possible to stack the moulds vertically one on top of another because the weight bearing on the lower moulds varies the pressure with which the meat is compressed by the mould cover, with resulting variations in the product quality, in some cases producing excessive and unacceptable pressures. Additionally the stacked moulds are not sufficiently stable.

A known method for stacking these moulds involves arranging them in a vertical pyramid formation, when each bottom die bears directly on two underlying bottom dies.

This stacking method poses various technical problems, the first being stability. Furthermore, the interspace between the bottom dies is relatively small and does not permit an efficient circulation of cooking steam between the moulds, with resulting poor temperature distribution; nor does this method enable arrangement of the exceeding parts of the bags outside the cavities of the bottom die along the longitudinal flanks of the mould, preventing good weight-loss performance.

In practice, the technology that involves the use of the moulds described above applies different means for handling moulds inside ovens, including transport systems with suspended tray conveyors which, however, require investment in expensive plants in which there is anyway a poor exploitation of the internal volume of the ovens.

In all cases, the risk of puncturing the bags is high, especially in the part thereof which is outside the mould, and the desired technological results are impossible to reach. Furthermore, "traditional" type moulds are not frequently used for the production of loaves, due amongst other things to handling problems caused by the weight, constructional shape and especially the difficulties of subjection to automated movement.

A second realisation includes, as a rationalisation of the stacking of products undergoing treatment in the cooking ovens, and for obtaining both the above-mentioned loaves of greater length and already-fractioned ones, the use of large trays superposable in columns and each comprising a plurality of mould bottom dies in upper position and an equal plurality of covers, fixed or slidable, located in the lower part of the tray, which close and press the products placed in the bottom dies of the underlying tray (producers of these include Armohnox, Kaufler, Creminox, Roser and others).

In this case, the meat cannot be bagged directly in the trays, so first it is necessary to fill the bags and place them under vacuum conditions using "dummy moulds", either using heat-formers or vacuum baggers and staplers connected thereto, after which the bags filled with meat are collected and transferred internally of the bottom dies of the trays.

This transfer stage leads not only to an inevitable displacement of the meat in the bags, especially in the case of higher quality foods, but is also an excessively laborious task for the operatives, as these are tasks that cannot be performed automatically. In some realisations the lower part of the trays includes covers which can slide with respect to the bottom die of the underlying tray.

The sliding is normally used to obtain products with weight loss, but in this case the weight loss is technologically limited by the possibility of collecting exudate which, for constructional reasons, can happen only in the heads of the bottom dies.

The slidable covers are further constrained to one another such as to be able to perform only one same displacement, such that a single cover cannot slide in the relative bottom die independently of the others.

The cooking of the products contained in the stacked trays can be done in suitably-modified steam ovens, or can be done by recycling of water in special hollow spaces (a system which is practically limited to products without weight loss), or even by immersion in water-filled baths.

SUMMARY

An aim of the present invention is to realise moulds having the characteristics of the traditional moulds, as in the first type of realisation described herein above, but which obviate the stacking problems as outlined above.

The aim is attained with the characteristics of the invention as reported in independent claim 1. The independent claims delineate preferred and/or particularly advantageous aspects of the invention.

In particular, the invention provides a moulding unit for forming and cooking meat, fit to be individually handled and fit to be stacked according to vertical columns and horizontal rows, comprising one single bottom die for containing the meat, and one single cover aligned with the mouth of the concavity of the bottom die, which is joined to the bottom die and positioned below it, such that it closes and may also slide internally of the concavity of the bottom die of a moulding unit identical to and positioned below it.

The invention enables a system of single moulds to be made up, which can be handled and used singly in the stage of forming the bag with the meat inside and vacuum-sealed.

The moulding units have the advantage of having the double role of bottom die and cover, with obvious logistical and handling advantages, as it is necessary to store and transport only moulding units all having the same shape and dimensions.

A further advantage is the possibility of arranging, with minimum risks of damage, the bag for the exudate on a side of the moulding unit and thus to treat products having a weight-loss level of a desired amount and in particular higher than what is obtainable with tray systems in the production of the loaves. The moulds obtained with the moulding units of the invention can thus be fractioned and also used for products with weight loss.

A further advantage is the possibility of avoiding the presence of dummy moulds, thus saving operative fatigue, as they no longer have to move the product from the dummy mould into the cooking mould thanks to the possibility of using automated and/or controlled transport and movement systems, together with a greater quality in terms of positioning as the product does not displace from the position imposed during the filling of the bag.

A further advantage is the possibility of using bottom dies (filling base) of maximum constructional simplicity. A further advantage is the possibility of using machines for washing the moulds which are smaller and less expensive than those required for cleaning the cited tray moulds. However, traditional washing machines can be used.

The moulding units of the invention are furthermore easily susceptible to stacking in vertical columns and in horizontal rows, thus attaining various other technical advantages.

A first advantage is that the moulding units can be stacked such as to rationalise the load during transport thereof on trucks or the like.

A further advantage is that adequate steam-, water- and/or air-recycling channels can be realised in the stack in order to obtain a more homogeneous distribution of the temperature in the cooking and cooling stages; this enables use of traditional ovens, though these should be specially adapted, but also enables cooking by immersion by use of suitable stack-moving systems.

A further advantage is that the loading and unloading for composing and de-stacking the ordered stack can be automated, with less unwieldy systems that are also less expensive and faster than the tray systems.

A further advantage is that the degree of pressure exerted on the product can be made independent of the point occupied by the mould in the stack.

A further advantage is that stable stacks can be obtained without the use of additional reference and securing systems.

BRIEF DESCRIPTION OF THE DRAWINGS

Further characteristics and advantages of the invention will emerge from a reading of the following description, provided by way of non-limiting example with the aid of the figures illustrated in the accompanying tables of the drawings.

FIG. 2 is a perspective view from below in an upwards direction of the moulding unit of FIG. 1;

FIG. 3 is an enlarged detail of FIG. 2;

FIG. 4 is a lateral view of the moulding unit of FIG. 1 in reduced scale;

FIGS. 5 and 6 are perpendicular projections of the view of FIG. 4;

FIG. 9 is section IX-IX of FIG. 8;

FIGS. 11, 12 and 13 are the view indicated by the arrow B in FIG. 10 which show the bench in three stages during the stacking of the moulding units of the present invention;

FIG. 14 is an enlarged detail of FIG. 12;

FIG. 16 is section XVI-XVI of FIG. 12;

FIGS. 17, 18 and 19 are an enlarged detail of FIG. 16 at successive moments during stacking of two moulding units of the present invention;

FIG. 20 is section XX-XX of FIG. 13;

FIG. 21 is a partial plan view of FIG. 11;

FIG. 23 illustrates an assembly of a plurality of moulding units as in FIG. 22, viewed in the direction denoted by C in FIG. 22;

FIG. 24 is section XXIV-XXIV of FIG. 23.

DETAILED DESCRIPTION OF THE PREFERRED EMBODIMENTS

Figure 1:
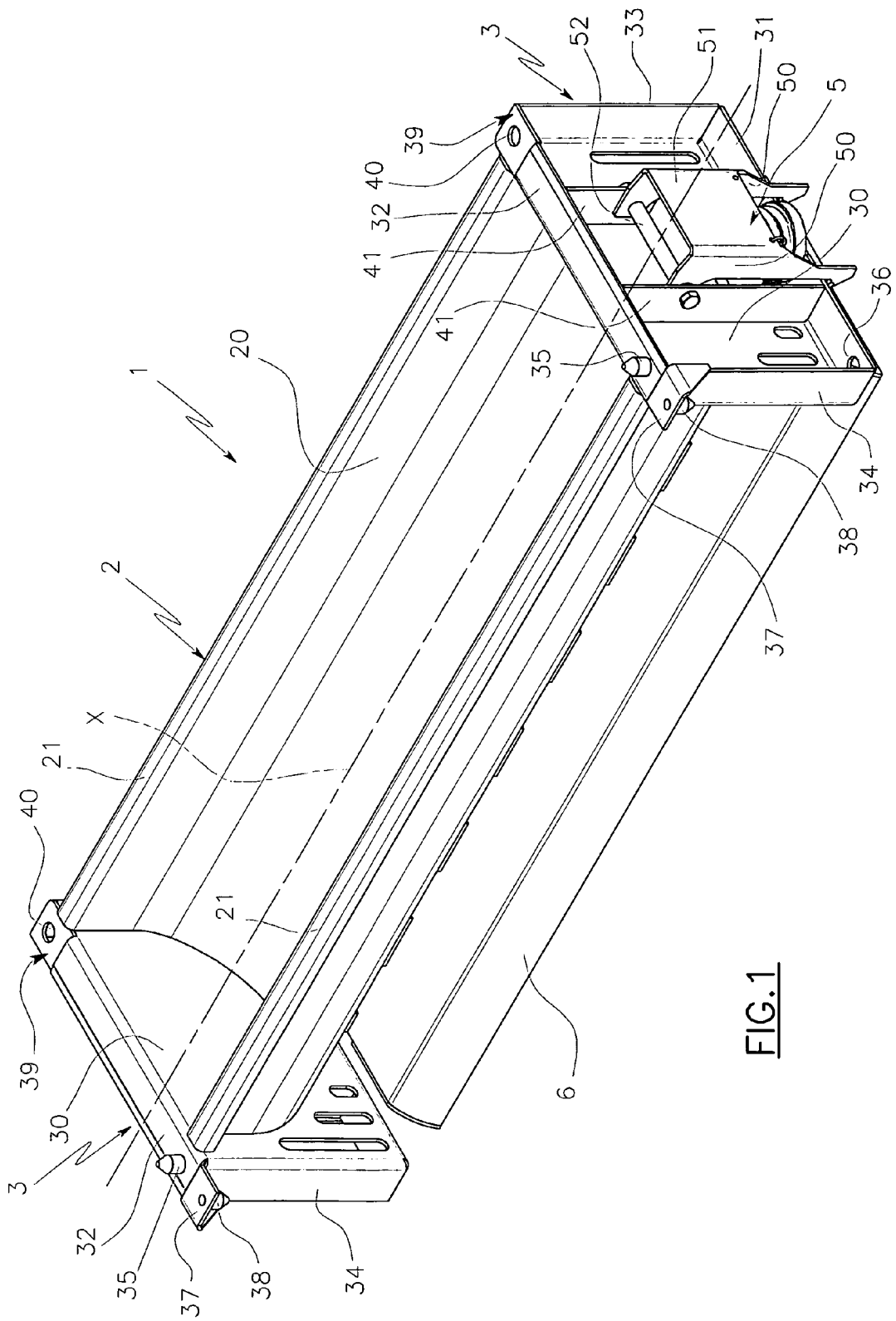
FIG. 1 is a downwards perspective view from above of a moulding unit for forming and cooking means of the present invention.

The moulding unit 1, object of the present invention, comprises a bottom die 2 shaped as a recipient and having a concavity facing in an upwards direction.

The bottom die 2 comprises a stainless steel element 20 which develops longitudinally following a horizontal axis X, with respect to which it exhibits a constant transversal section with a substantially U-shape.

The longitudinal edges 21 of the element 20 are bent externalwise in order to increase the rigidity of the bottom die 2 and such that the surfaces delimiting the mouth of the concavity are as rounded as possible.

The bottom die 2 further comprises two stainless steel heads 3, which are respectively fixed to the front and rear ends of the element 20.

The front head 3 is perfectly symmetrical at the rear head 3, with respect to plane of symmetry which is perpendicular to the longitudinal axis X and passing through the half-way line of the element 20.

Each head 3 comprises a closing plate 30 which is vertically orientated and is destined to close a respective end of the element 20, such as to delimit the recipient defined by the bottom die 2.

The closing plate 30 has a substantially rectangular shape with a larger size than that of the transversal section of the element 20, with respect to which it therefore exhibits a projecting portion.

The projecting portion of the closing plate 30 exhibits a series of lightening slots which facilitate recycling of steam, air, water.

Each closing plate 30 is surrounded by a wall perimeter frame which develop projectingly towards the outside, i.e. on the opposite side with respect to the element 20.

The walls are preferably made by bending, in a single piece with the closing plate 30.

In more detail, the perimeter frame comprises two pairs of parallel and opposite walls, of which two horizontal walls, respectively a lower wall 31 and an upper wall 32, and two vertical walls, respectively a right wall 33 and a left wall 34.

Figure 7:
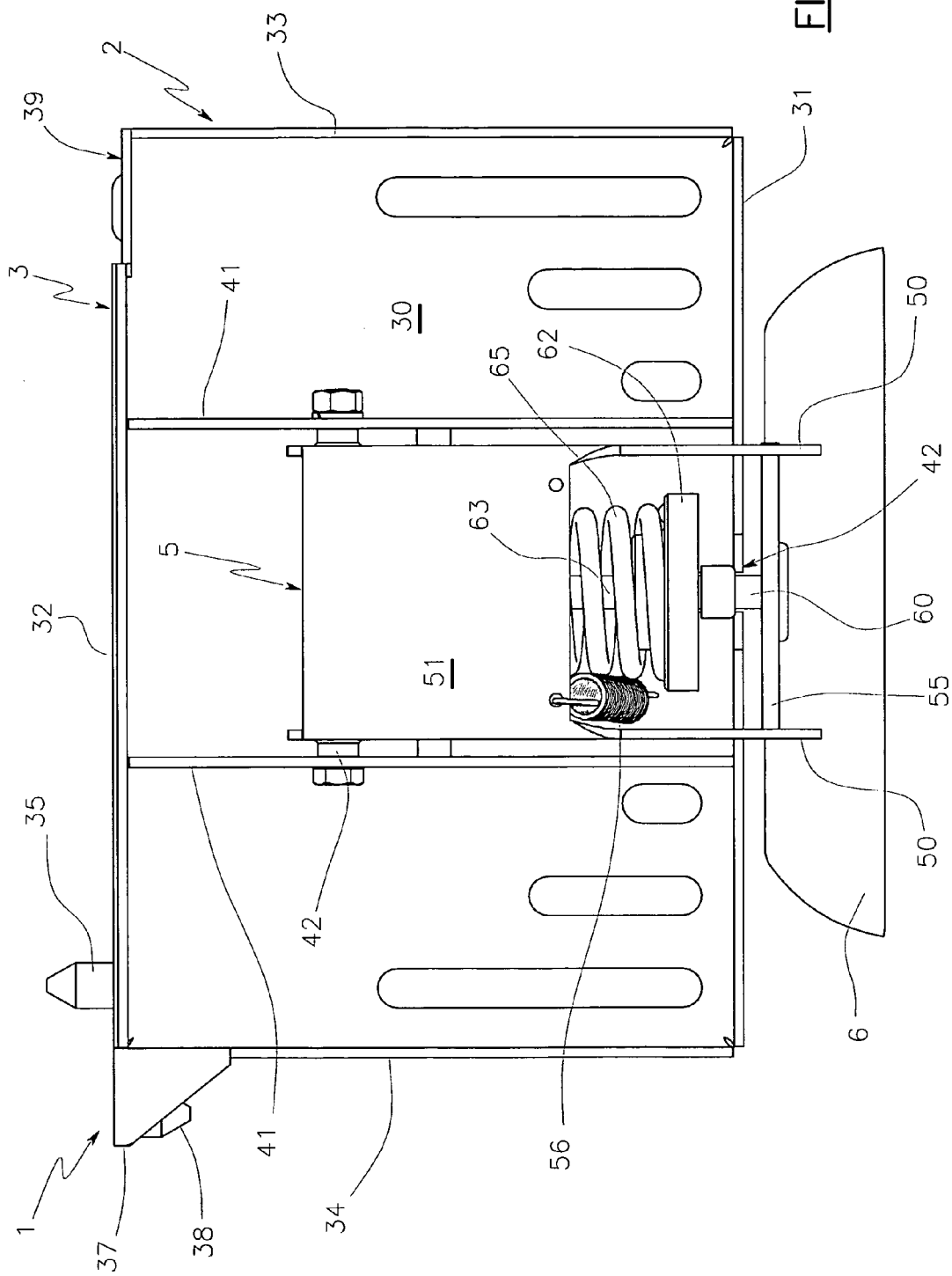
FIG. 7 is the view denoted by the arrow A in FIG. 4, shown in large-scale.

The concept of right and left relate to the element 20 as seen in FIG. 7.

The upper horizontal walls 32 are at the same level as the longitudinal edges 21 of the element 20, such as to define a rectangular mouth with the longitudinal edges 21 for the concavity of the bottom die 2.

The lower horizontal walls 31 are borne by the relative closing plates 30 at a lower height than the bottom of the element 20, just as the left 33 and right 34 vertical walls are borne at an appropriate distance from the longitudinal edges 21 adjacent thereto.

Naturally the lower horizontal wall 31, the upper horizontal wall 32, the right vertical wall 33 and the left vertical wall 34 of the front head 3 are respectively coplanar to the lower horizontal wall 31, the upper horizontal wall 32, the right vertical wall 33 and the left vertical wall 34 of the rear head 3.

A first projecting pin 35 is fixed on the upper horizontal wall 32 of each head 3, which pin 35 is positioned in proximity of the left vertical wall 34 and develops vertically upwards.

The lower horizontal wall 31 of each head 3, in a coaxial position with the first projecting pin 35, exhibits a first through-hole 36 with a vertical axis.

Each head 3 further comprises a shelf 37 which is coplanar with the upper horizontal wall 32 and projects with respect to the left vertical wall 34.

The shelf 37 exhibits substantially the same width as the upper horizontal wall 32 and is further fixed to the flank of the left vertical wall 34 by means of a vertical strengthening band.

A second projecting pin 38 is fixed to the shelf 37, which develops vertically in a downwards direction and is appropriately distanced from the left lateral wall 34.

On the opposite side with respect to the shelf 37, i.e. in proximity of the right vertical wall 33, the upper horizontal wall 32 of each head 3 exhibits a flat lowered seating 39, the depth and the plan-view dimensions of which are substantially the same respectively as the thickness and the plan-view dimensions of the opposite shelf 37.

The lowered seating 39 exhibits a second vertical-axis through-hole 40, an axis of which is distanced from the right vertical wall 33 by a quantity which is about equal to the distance between the axis of the second projecting pin 38 and the left lateral wall 34.

Each head 3 further comprises two vertical flat ribs 41 which project from the closing plate 30 towards the outside, connecting the lower horizontal wall 31 and the upper horizontal wall 32.

The flat ribs 41 are arranged symmetrically with respect to a vertical plane that is parallel to the longitudinal axis X passing through the centre of the element 20.

The flat ribs 41 stiffen the head 3, preventing the horizontal walls 31 and 32 from flexing towards one another when the subjected to large weights.

Finally, each head 3 comprises an identical oscillating arm 5, which is substantially snugly housed in the space comprised between the flat ribs 41. The oscillating arm 5 comprises two shaped flanks 50, identical and perfectly opposite, which are orientated parallel to the flat ribs 41 are connected by a separating front strip 51.

The shaped flanks 50 and the front strip 51 are obtained by cutting and subsequent bending of a single steel plate.

The shaped flanks 50 are both associated to a single horizontal-axis hinging pin 52, ends of which are coupled to the flat ribs 41, such as to enable the oscillating arm 5 to rotate about the axis of the hinging pin 52.

As illustrated in FIG. 9, starting from the hinging pin 52, the shaped flanks 50 develop downwards, such that the lower ends thereof can project below the lower horizontal wall 31 of the relative head 3.

The lower ends are substantially shaped as hooks provided with a single tooth which develops horizontally below the lower horizontal wall 31.

The tooth comprises an upper surface 53 facing towards the lower horizontal wall 31, and an upper surface 54 facing downwards.

Both the surfaces 53 and 54 are inclined from below upwards towards the inside, i.e. towards the element 20, but the inclination of the lower surface 54 is much more accented than the inclination of the upper surface 53.

The lower ends of the shaped flanks 50 are reciprocally connected by an intermediate horizontal stiffening rod 55.

As illustrated in FIGS. 2 and 7, each oscillating arm 5 is also connected to the relative head 3 by a recall spring 56, which exhibits a first end which is coupled to a through-hole afforded in the front strip 51 of the oscillating arm 5, and the opposite end which is coupled similarly to the closing plate 30 of the head 3.

The recall spring 56 acts on the front strip 51 in the sense that it rotates the oscillating arm 5 from above in a downwards direction, such as to keep it normally in the operating position illustrated in FIG. 9, in which the shaped flanks 50 are stationary in contact against the lower horizontal wall 31, with the hook end projecting below the said lower horizontal wall 31.

Note that in this position, the distance between the upper surface 53 of the hook and the lower horizontal wall 31 is substantially the same as or slightly greater than the thickness of the upper horizontal wall 32; and the transversal section of the upper horizontal wall 32 exhibits an end tract which is slightly inclined from above in a downwards direction, substantially like the upper surface 53 of the hook 53, with the aim of making the coupling of the two sides more secure when hooked to one another.

The moulding unit 1 finally comprises a cover 6, which is joined to and positioned below the bottom die 2.

The cover 6 is slightly convex, with the cavity facing downwards, and in plan view exhibits the same rectangular shape as the mouth of the concavity of the bottom die 2, with which it is perfectly aligned.

As illustrated in FIG. 9, the cover 6 is fixed to a longitudinal support beam 60, which is parallel to the longitudinal axis X and interposed between the cover 6 and the element 20 of the bottom die 2.

The support beam 60 develops over the whole length of the cover 6 and the element 20, and terminates with two opposite end portions 61 which project from the closing plates 30 of the heads 3.

Figure 8:
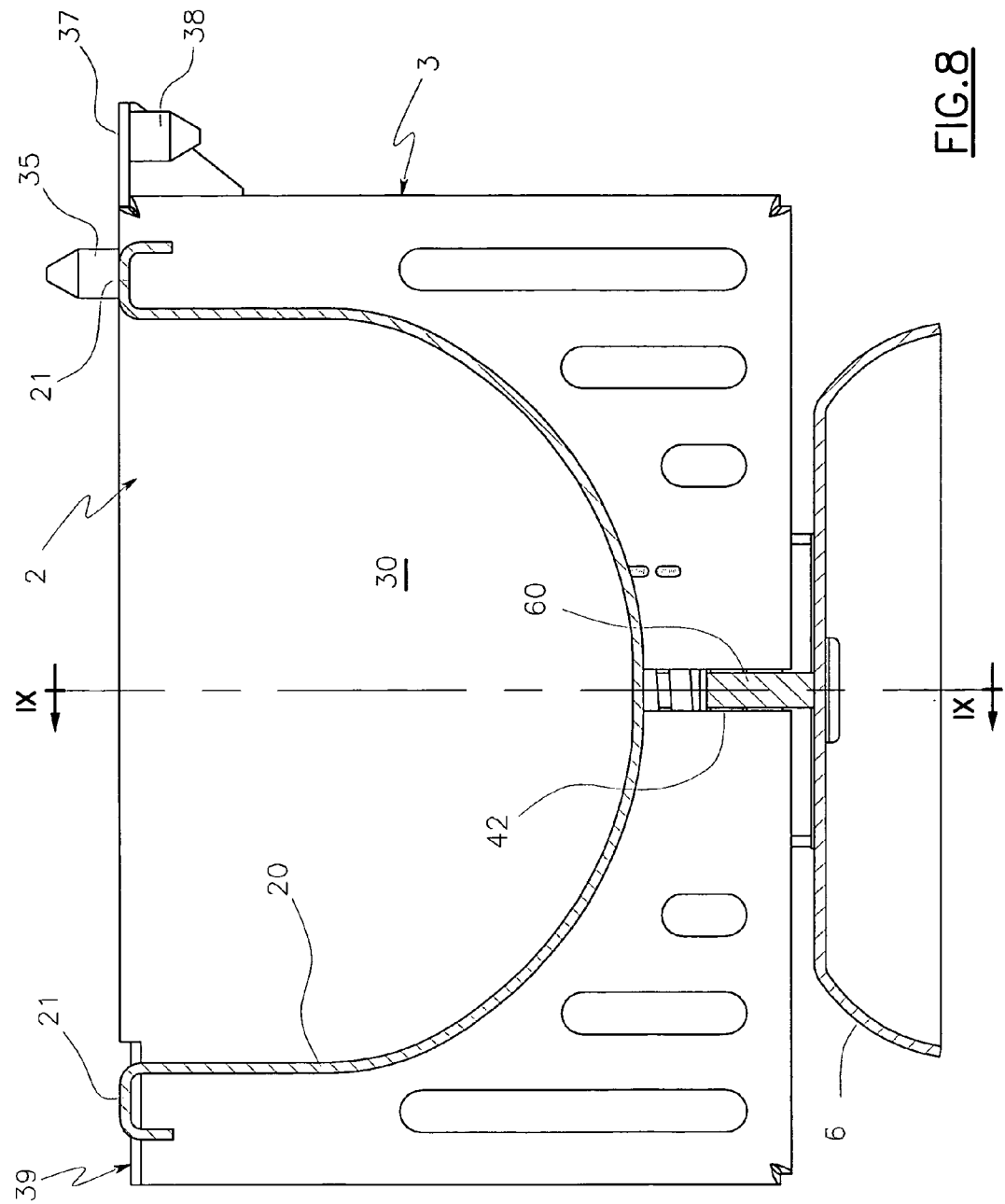
FIG. 8 is section VIII-VIII of FIG. 4, shown in the same scale as FIG. 7.

As illustrated in FIGS. 8 and 3, the transversal section of the beam 60 is rather narrow, such that each of the end portions 61 is housed in a vertical guide slit 42 afforded in the relative head 3.

In particular, the guide slit 42 vertically cuts through both the closing plate 30 and the lower horizontal wall 31 of the head 3.

Each end portion 61 of the support beam 60 is welded to a plate 62, which is slidably inserted on a guide screw 63.

The guide screw 63 is screwed onto a threaded hub which is fixed to a shelf 64, which is welded to and projects from the closing plate 30 towards the outside, and is hidden behind the front strip 51 of the oscillating arm 5.

A spring 65 is interposed between the projecting shelf 64 and the plate 62, which spring 65 is destined to constantly push the plate 62 downwards against the head of the guide screw 63 which defines the end-run position. When the plates 62 are in the endrun position, the cover 6 is at the maximum allowed distance from the bottom of the element 20.

Note that in this endrun position, the end portions 61 of the support beam 60 are both positioned higher than the lower horizontal walls 31 of the relative heads 3. From the endrun position, the cover 6 can be neared to the element 20 by a pressure against the spring 65 action, which pushes the plates 62 slidingly upwards on the relative guide screws 63.

Although it is not illustrated here, the bottom die 2 could also be provided with adjusting means which enable the springs 65 to be pre-loaded. In use, a plurality of identical moulding units 1 are arranged in superposed layers on a special bench 7 to form a stack made of vertical columns and horizontal rows.

Figure 10:
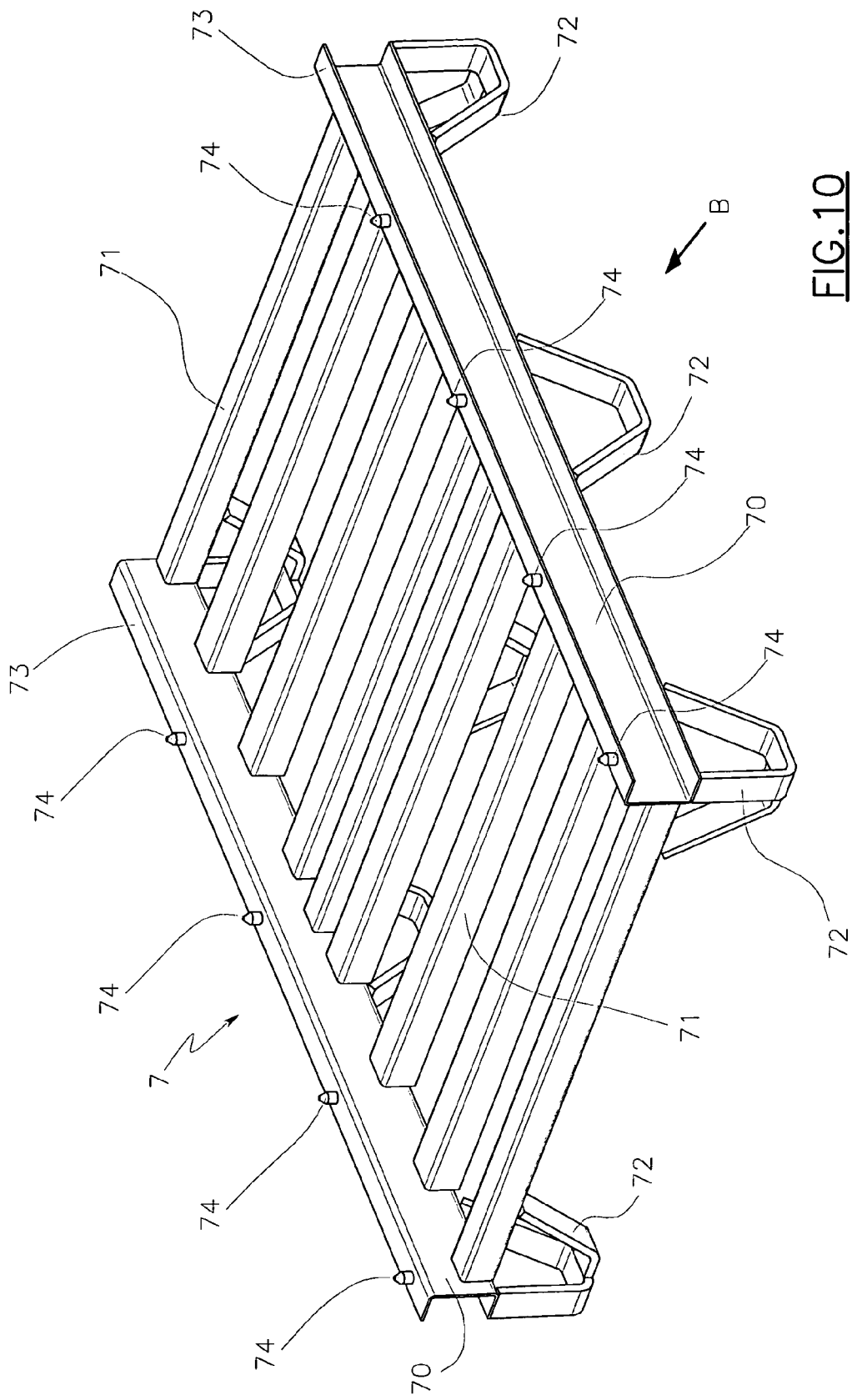
FIG. 10 is a perspective view of a bench for stacking moulding units according to the present invention.
Figure 15:
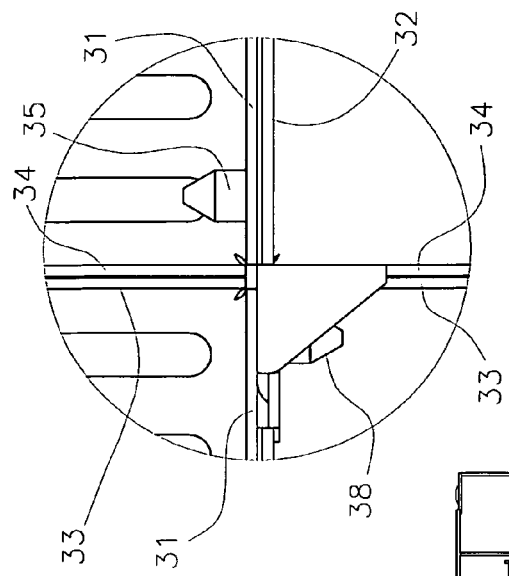
FIG. 15 is an enlarged detail of FIG. 13.

As illustrated in FIG. 10, the bench 7 comprises two longitudinal members 70, parallel and coplanar, which are reciprocally connected by means of a series of crossbars 71, and are provided with a set of feet 71 for resting on the ground.

The longitudinal members 70 are reciprocally separated by a distance which is about equal to the length of the elements 20 of the single moulding units 1, and are singly realised by a C-shaped beam which provides an upper horizontal wall 73.

Pins 74 are fixed on each upper wall 73, which pins 74 project vertically upwards, are aligned in a longitudinal direction and are separated by a constant step which is about the same as the width of the heads 3 of the single moulding units 1.

Each pin 74 of a longitudinal member 70 is aligned in a transversal direction with a pin 74 of the opposite longitudinal member 70.

The single moulding units 1 are located on the bench 7, orientated in a transversal direction with respect to the longitudinal members 70.

With reference to FIG. 11, the first moulding unit 1 to be located on the bench 7 is the one which is more to the left.

In detail, the first moulding unit 1 is positioned on the bench 7 by a vertical movement from above directed downwards, by means of which the lower horizontal walls 31 of the head 3 are each rested on the upper wall 73 of a respective longitudinal member 70, taking care to insert the first through-holes 36 on a respective pin 74.

The bilateral constraint between the first through-holes 36 of the heads 3 and the pins 74 of the longitudinal members 70 ensure a high horizontal stability of the moulding units 1 on the bench 7.

The second moulding unit 1 is positioned on the bench 7 such as to be parallel and flanked at the same level as the first moulding unit 1, with the left vertical walls 34 of each moulding unit 1 rested against the right vertical walls 33 of the first moulding unit 1.

As illustrated in FIG. 21, the contact between the vertical walls of the two moulding units 1 determines the relative distance D between the respective elements 20.

The distance D is selected such as to leave a space between the elements 20 that is sufficiently large to facilitate circulation of the steam, the air or the hot water, during the stages of cooking of the meat, and the air and/or the cold water, during the stages of cooling.

The positioning of the second moulding unit 1 is also done via a vertical movement from above in a downwards direction, by which the lower horizontal walls 31 of the heads 3 are each rested on the upper wall 73 of a respective longitudinal element 70, taking care to insert the first through-holes 36 on a respective pin 74.

During this vertical movement the second pins 38 of the second moulding unit 1 are also inserted in the second through-holes 40 of the first moulding unit 1, such as to realise a bilateral coupling which constrains them reciprocally in a horizontal direction, considerably increasing the stability thereof.

As illustrated in FIG. 14, the projecting shelves 37 of the second moulding unit 1 rest internally of the lowered seatings 39 of the first moulding unit 1, such that at the conclusion of the positioning the upper horizontal walls 32 of both the moulding units 1 are perfectly coplanar.

The following moulding units 1 are positioned on the bench 7 identically to what is described for the second moulding unit 1, one at a time and on top of the preceding moulding unit 1, up until a complete layer of flanked moulding units 1 at a same level is achieved, as shown in FIG. 12.

In the illustrated example, the layer is formed by four moulding units 1 but could naturally be formed by any other number of moulding units 1.

At this point, the bottom die 2 of the moulding units 1 of the first layer are filled with the meat to be treated.

For example, a waterproof wrapper is inserted into the cavity of each bottom die 2. The wrapper is then filled with meat and is hermetically closed, normally under vacuum. To achieve the weight-loss, a portion of the wrapper is left empty, in excess of the portion required for containing the meat, which is left projecting externally of the concavity of the bottom die 2, in the space D comprised between the element 20 and the adjacent bottom die 2.

Advantageously, the bottom dies 2 can be handled and stacked when already individually filled with meat and vacuum-packed in a place apart, for example using heat-formers or vacuum-baggers and staplers connected thereto; they can also be used similarly with permeable wrappers.

After the bottom dies 2 have been filled, a second layer of upper moulding units 1 is laid above the lower moulding units in the first layer. With reference to FIG. 12, the first upper moulding unit 1 to be positioned is the one furthest to the left.

The first upper moulding unit 1 is placed such that the cover 6 thereof is coaxial in plan view with the mouth of the concavities of the bottom die 2 of the lower moulding unit 1.

Successively the upper moulding unit 1 is engaged in a vertical movement from above in a downwards direction, such that its cover 6 inserts on and closes the mouth of the bottom die 2 of the lower moulding unit 1.

During this downwards displacement, the cover 6 slides for a tract internally of the bottom die 2, up until it reaches contact with the meat contained therein.

When the cover 6 stops against the meat, the bottom die 2 of the upper moulding unit 1 lowers further thanks to the plates 62 with slide on the guide screws 63, contemporaneously causing the compression of the springs 65 which thus push the cover 6 in the direction of more greatly compressing the meat contained in the bottom die 2 of the lower moulding unit 1.

In particular, the bottom die 2 of the upper moulding unit 1 is lowered up to resting the lower horizontal walls 31 of the head 3 in contact against the upper horizontal walls 32 of the lower moulding unit 1, taking care to insert the first through-holes 36 of the upper moulding unit 1 on the first pins 35 of the lower moulding unit 1.

The bilateral constraint between the first through-holes 36 and the first pins 35 ensures correct reciprocal positioning and a high horizontal stability of the upper moulding unit 1 with respect to the lower moulding unit 1.

As illustrated in FIG. 20, the contact between the horizontal walls 31 of the upper moulding unit 1 and the horizontal walls 32 of the lower moulding unit determines the relative distance E between the cover 6 and the bottom die 2 of the upper moulding unit 1.

The distance E is chosen such as to leave a sufficiently large space to facilitate circulation of the steam, the air or the hot water, during the stages of cooking of the meat, the air and/or the cold water, during the stages of cooling.

As illustrated in figures from 17 to 19, during the lowering of the bottom die 2 each oscillating arm 5 of the upper moulding unit 1 is maintained by the recall spring 56 in the operating position, up to when the lower inclined surface 54 of the hook end reaches contact against the edge of the upper horizontal wall 32 of the lower moulding unit 1.

From this moment, a further lowering of the bottom die 2 of the upper moulding unit 1 makes the upper horizontal wall 32 of the lower moulding unit 1 push the oscillating arm 5 to rotate from below upwards contrastingly to the recall spring 56, towards a release position in which it can pass beyond.

In this way, when the hook ends advance past the upper horizontal wall 32 of the lower moulding unit 1, the oscillating arm 5 returns with a click into the initial operating position, pushed by the recall spring 56.

When this occurs, the upper horizontal wall 32 of the lower moulding unit 1 is interposed between the horizontal wall 31 of the upper moulding unit 1 and the upper surface 53 of the oscillating arm 5, such that the upper moulding unit 1 is hooked to the lower moulding unit 1 in a vertical direction.

Naturally the hooking of the two oscillating arms 5 is done simultaneously. The unhooking of the two moulding units 1 can be obtained, when necessary, by manual or automatic activating of the oscillating arms 5 to bring them into release position and thus to free the hooked coupling.

The upper second moulding unit 1 of the second layer is coupled entirely identically to the corresponding lower moulding unit 1 of the first layer.

The positioning of the upper second moulding unit 1 is also done by means of a vertical movement from above in a downwards direction, by which the lower horizontal walls 31 of the heads 3 are each rested on the upper horizontal wall 32 of the lower moulding unit 1, taking care to insert the relative through-holes 36 on a respective first pin 35.

During this vertical movement the projecting shelves 37 of the upper second moulding unit 1 are also rested internally of the lowered seatings 39 of the upper first moulding unit 1, by inserting the second pins 38 internally of the second through-holes 40, such as to realise a bilateral coupling constraining the two upper moulding units horizontally, considerably increasing the stability.

On completing the coupling, the upper second moulding unit 1 is parallel to and flanked at the same level as the upper moulding unit 1.

In particular, the left vertical walls 34 of the upper second moulding unit 1 are rested contactingly with the right vertical walls 33 of the upper first moulding unit 1, in order to fix the relative distance D between the respective elements 20.

Figure 13:
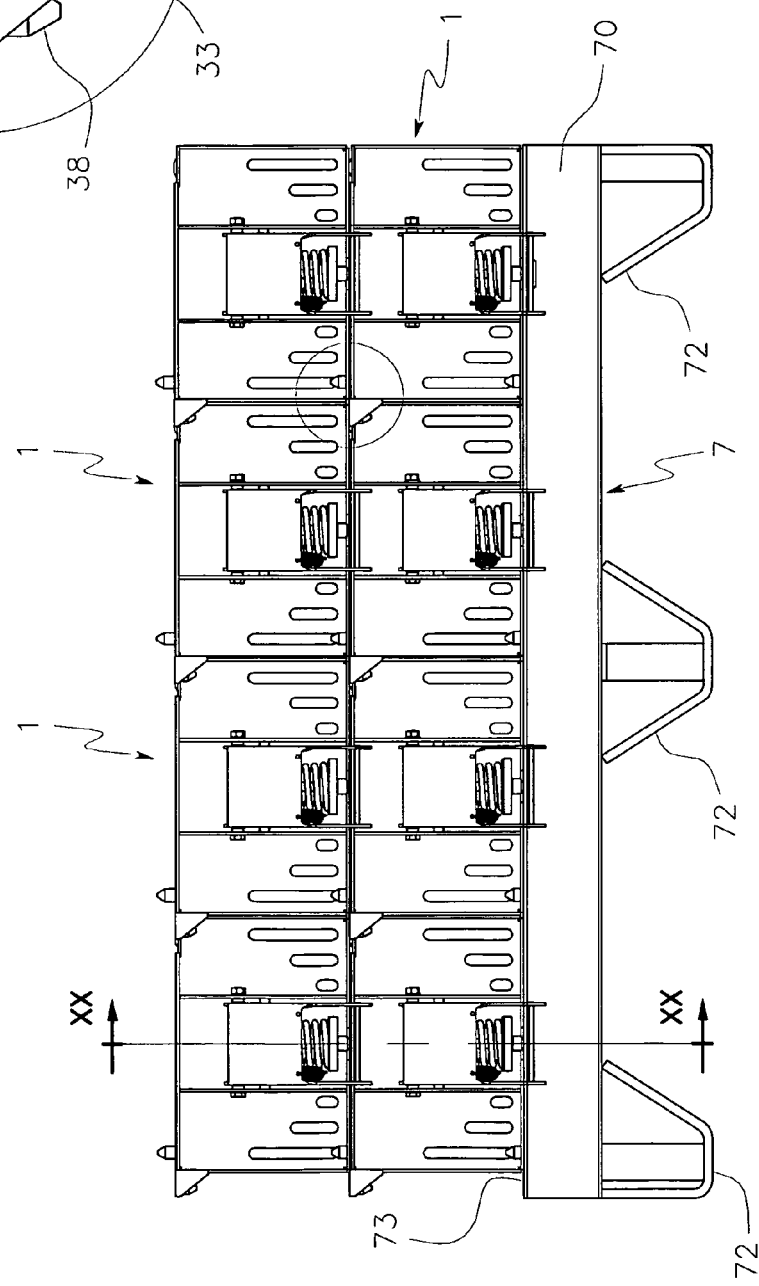
Figure 22:
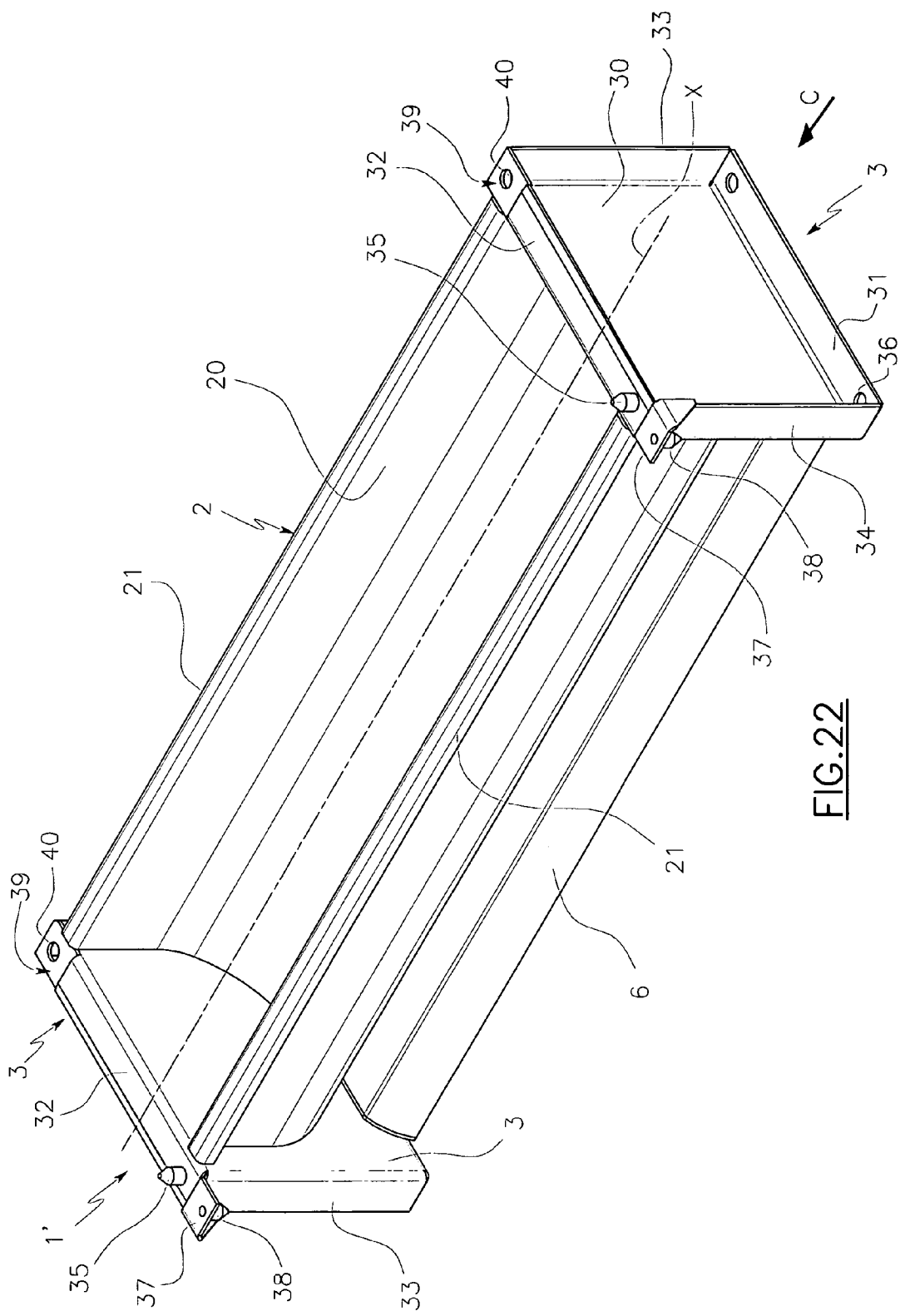
FIG. 22 is a downwards perspective view from above of a moulding unit for forming and cooking meat in an alternative embodiment of the invention.

The successive upper moulding units 1 are then positioned similarly, one at a time and each time resting them on the preceding moulding unit 1, up to completing the second layer as shown in FIG. 13.

At this point, the bottom dies 2 of the upper moulding units 1 of the second layer are filled with the meat to be treated, as described above, before predisposing thereon a third layer of moulding units 1, and so on up to realisation of a stack having any desired height.

Naturally the moulding units 1 could be filled with the meat to be treated, before being stacked on one another on the bench 7.

Thanks to the moulding units 1 of the invention, the final stack will be very compact and stable, thanks to the coupling between the first pins 35 and the first holes 36 which ensure horizontal stability between each pair of superposed moulding units 1, thanks to the coupling of the second pins 38 and the second holes 40 which ensures the horizontal stability between each pair of flanked moulding units 1, and thanks to the oscillating arms 5 which vertically block each pair of superposed moulding units 1.

These characteristics also make the stack easy to move and transport, as they enable more or less automatic and relatively simple movement systems to be used.

Note that the same results could be obtained with moulding units 1 having slightly different shapes.

For example, the projecting shelves 37 and the lowered seatings 39 of the heads 3 might have their positions inverted, i.e. might be located respectively at the right vertical wall 33 and the left vertical wall 34; or they might be located in the lower part of the heads 3 or on the lower horizontal walls 31, with the second pins 38 facing upwards.

In a further variant, the projecting shelves 37 could be provided with a through-hole and the lowered seatings 39 of a projecting pin could be destined to engage in the hole. In this way, the pin might also perform the function of the first pin 35, as long as the first through-hole 36 were displaced onto the opposite side of the head 3.

A particularly simple and economical alternative embodiment of the invention is illustrated in figures from 22 to 24.

This embodiment provides a moulding unit Y which differs from the preceding moulding unit Y in that the cover 6 is rigidly fixed to the heads 3 below the relative bottom die 2, and in that it is without the oscillating arms 5, and also without any other element for hooking two identical and reciprocally-superposed moulding units 1'.

In detail, the ends of the cover 6 are respectively fixed to the closing plates 30 of the heads 3, such that the lower edge of the cover 6 is at the same level as the lower horizontal walls 31.

Note that in this case too a space E is left between the cover 6 and the relative overlying bottom die 2, to facilitate the circulation of the steam, the air or the hot water, during the stage of cooking the meat, and of the air and/or the cold water during the stages of cooling.

The assembly and thus the use of the moulding units Y is entirely similar to what is described herein above, with the only difference that due to the lack of the hooking elements they vertically-directed coupling between two superposed moulding units 1', i.e. the vertical stability of a stack, is guaranteed by the weight of the upper moulding unit Y (even when empty) which bears down and tends to remain constantly on the underlying moulding unit 1'.

Consequently even the compacting of the meat internally of the bottom die of the underlying moulding unit Y is due only to the action of the weight force, so that these moulding units Y are prevalently destined to be used for products without weight loss (or with a low percentage) to which a generally modest level of vertical compression is applied.

Obviously a technical expert in the field might made technical-applicational modifications to the moulding units 1 as described herein above, without forsaking the ambit of the invention as described herein below.

What is claimed is:

1. A moulding unit for forming and cooking meat, comprising a recipient-shaped bottom die (2) having a concavity facing upwards, destined to contain meat, comprising a bottom die (2) and a cover (6) aligned with a mouth of the concavity of the bottom die (2), said cover (6) is joined to the bottom die (2) and positioned below the bottom die (2), such as to be able to close the mouth of the bottom die (2) of a further moulding unit which is identical to and positioned below the moulding unit, the moulding unit being fit to be individually handled and fit to be stacked in vertical columns and in horizontal rows, wherein the bottom die (2) comprises constraining elements (33, 34, 38, 40) configured to cooperate with constraining elements (33, 34, 38, 40) of an identical moulding unit flanking the moulding unit at a same level thereas, in order to define contact walls or a releasable bilateral constraint in a horizontal direction between the moulding unit and the flanking moulding unit, and wherein the bottom die (2) comprises a connector (5, 32) comprising at least a first hook element (5) and at least a second hook element (32), wherein the first hook element (5) is destined to hook to the second hook element (32) of an identical moulding unit positioned below another moulding unit, when lower contact surfaces (31) of the upper moulding unit are resting on upper contact surfaces (32) of the underlying moulding unit, creating a constraint which prevents the upper moulding unit from separating from the underlying moulding unit in a vertical direction.

2. The moulding unit of claim 1, wherein the cover (6) is joined to the bottom die (2) by a guide (62, 63) which enable reciprocal displacements in a vertical direction, elastic members (65) being provided for pushing the cover (6) towards an endrun position in which the cover (6) is at a maximum relative distance from the bottom die (2).

3. The moulding unit of claim 1, wherein the bottom die (2) comprises right lateral contact walls (33) and left lateral contact walls (34), the left lateral contact walls (34) being destined to contact against the right lateral contact walls (33) of an identical flanking moulding unit which is located at a same level thereas, in order to establish a minimum relative horizontal distance there-between.

4. The moulding unit of claim 1, wherein the bottom die (2) comprises upper contact walls (32) and lower contact walls (31), the lower contact walls (31) being destined to rest on the upper contact walls (32) of an identical moulding unit positioned below a moulding unit, in order to establish a minimum vertical distance there-between.

5. The moulding unit of claim 1, wherein the first hook element (5) is mobile on the bottom die (2) between an operating position in which it is destined to realise a hooking with the second hook element (32) of the underlying moulding unit, and at least a release position in which the hooking is freed.

6. The moulding unit of claim 5, wherein the first hook element (5) is associated to elastic biasing members (56) destined to push the first hook element (5) into the operating position thereof, and in that the first hook element (5) and the second hook element (32) are conformed such that following a vertical nearing movement of the upper moulding unit to the underlying moulding unit, the first hook element (5) of the upper moulding unit is pushed by the second hook element (32) of the underlying moulding unit towards the release position thereof, in opposition to the elastic biasing members (56), up to reaching a relative vertical position in which the second hook element (32) of the underlying moulding unit returns with a click-coupling into the operating position.

7. The moulding unit of claim 1, wherein the bottom die (2) comprises second constraining elements (35, 36) for cooperating with second constraining elements (35, 36) of another identical moulding unit positioned below the upper moulding unit, when the lower contact surfaces (31) of the upper moulding unit are resting on the upper contact surfaces (32) of the underlying moulding unit, in order to define a bilateral constraint in a horizontal direction between the upper moulding unit and the underlying moulding unit.

8. The moulding unit of claim 7, wherein the constraining elements comprise at least two vertically-developing engaging elements (35), and at least two vertical-axis holes (36), which are destined to receive respectively the engaging elements (35) of an identical moulding unit stacked on the underlying moulding unit.

9. The moulding unit of claim 1, wherein the constraining elements comprise at least two further vertically-developing engaging elements (38), and at least two further vertical-axis holes (40), which are respectively destined to receive the further engaging elements (35) of an identical and flanking moulding unit stacked at a same level as the moulding unit.

10. The moulding unit of claim 3 wherein the bottom die (2) comprises two heads (3) positioned at opposite ends of the concavity, each of the heads (3) comprising a rectangular closing plate (30) arranged vertically for closing the respective ends of the concavity, the closing plate (30) being surrounded by a perimeter frame of walls perpendicular to the closing plate (30), of which two are opposite horizontal walls (31, 32) destined respectively to define a lower contact surface and an upper contact surface, and two opposite vertical walls (33, 34) destined respectively to define a right lateral contact surface and a left lateral contact surface.

11. The moulding unit of claim 1, wherein the second hook element is provided by the upper horizontal wall (32) of a head (3), and the first hook element comprises an arm (5) which is hinged at a horizontal axis on an external flank of the closing plate (30) of the head (3) and develops downwards and terminates with a hook element which projects below the lower horizontal wall (31), for hooking the upper horizontal wall (32) of a head (3) of an identical moulding unit positioned below the moulding unit.

12. The moulding unit of claim 10, wherein the heads (3) comprise a horizontal shelf (37) projecting transversally from a first of the vertical walls (33, 34) and coplanar with a first of the horizontal walls (31, 32), the first horizontal wall (31, 32) exhibiting a lowered seating (39) located at the second vertical wall, which lowered seating (39) is destined to restingly receive the projecting shelf (37) of a moulding unit which is identical to and flanking the moulding unit, the further vertical-axis holes (40) and the further vertically-developing engaging element (38) being respectively associated to the lowered seatings (39) and to the projecting shelves (37) or vice versa.

* * * * *